B. DE ST. SEINE.
SMELTING FURNACE.
APPLICATION FILED OCT. 19, 1909.
952,284.
Patented Mar. 15, 1910.
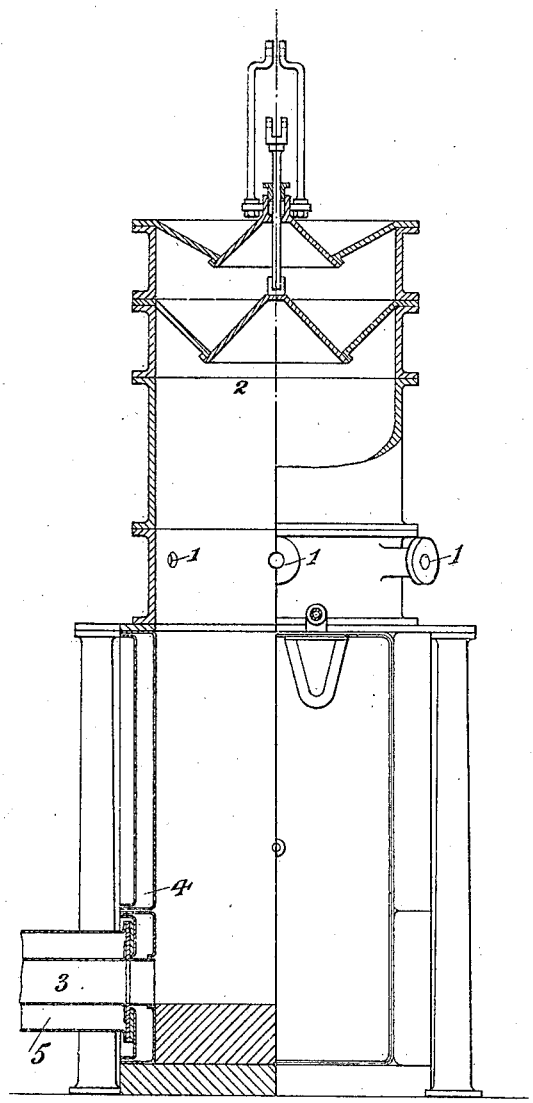
WITNESSES
L. H. Grote
M. E. Keir
INVENTOR
Bernard de Saint Seine
By
Howson and Howson
his ATTORNEYS

UNITED STATES PATENT OFFICE.

BERNARD DE ST. SEÏNE, OF PARIS, FRANCE, ASSIGNOR TO THWAITES BROTHERS, LIMITED, OF BRADFORD, ENGLAND.

SMELTING-FURNACE.

952,284.    Specification of Letters Patent.    Patented Mar. 15, 1910.

Application filed October 19, 1909. Serial No. 523,524.

*To all whom it may concern:*

Be it known that I, BERNARD DE SAINT SEÏNE, a citizen of the Republic of France, of 366 Rue St. Honoré, Paris, in the Republic of France, have invented new and useful Improvements in Smelting-Furnaces, of which the following is a specification.

The object of this invention is to provide an improved down-blast furnace with a single row or series of twyers in which the smelting of ores, residues, and the like, for the obtainment of copper, or other metals, therefrom, can be effected in a more efficient and economical manner than hitherto, from a mixture of ore or fuel, the smelting being effected entirely below the twyers, the melting zone starting downward from the level of such twyers and the whole of the air admitted to the furnace through the twyers passing into the charge of mixed ore and fuel and downward through the whole of the melting zone below the twyers.

The accompanying drawing represents, partly in vertical section, sufficient of a furnace to illustrate the present invention.

The twyers 1, 1, are situated so that the blast therefrom is passed into the charge of mixed ore and fuel entirely at the top of the melting zone and the furnace is closed at top so that the air and gases pass entirely through the whole of the melting zone in a downward direction, the gases issuing at the lower part of the furnace with the molten products. The furnace is kept full, or practically full, of the charge of mixed fuel and ore residues, or the like, to be smelted, the mixture being introduced into the furnace by means of any suitable arrangement which will prevent egress of any objectionable quantity of air and gases from the furnace during charging, for instance a double-valved charging hopper 2 may be used, the upper valve being first opened to discharge the mixture onto the lower valve, and then the upper valve being closed and the lower valve opened.

The molten products and the gases are delivered from the lower part of the furnace, at the outlet 3, into a covered fore-hearth, or into a reverberatory furnace, or the like, wherein the molten products collect (for any required subsequent treatment) while the gases escape to a chimney. There may be two, or more, such fore-hearths, reverberatory furnaces, or the like, and a spout can be arranged in connection with the outlet 3 so that the said spout can be swung from one to the other, or others, of such fore-hearths, or the like, and the molten products can be discharged into each alternately while the products in the other, or others, are being treated. I have shown the furnace and outlet passage 3 as being provided with water jackets 4 and 5 respectively, through which water is circulated. The furnace and outlet passage can be made, on the aforesaid principle, of any suitable material and construction convenient for the easy flow of the molten material and the passage of the escaping gases, provided that the twyers are arranged to pass the blast into the mixed charge entirely at the upper part of the zone of fusion.

The mode of working in a furnace made in accordance with this invention prevents the formation of deposits, such as are known as "bears," which formation often occurs in ordinary smelting, and further, ores, residues, or the like, of any degree of fineness, mixed with any suitable fuel, can be smelted without being previously briqueted, because, as the blast passes entirely from above at the upper part of the zone of fusion, and downward through the melting part of the charge, fine matter cannot escape from the furnace without being reduced to a molten state. Moreover, hotter slags are obtained, from which the separation of the required products, such as copper matte, or the like, can be effected in a better, and more efficient manner than hitherto, while ores, residues, and the like, containing, as impurities, large quantities of volatile metals, such as zinc for example, can be efficiently smelted without the formation of accretions which, in ordinary smelting, have stopped the passages for the blast and interfered with the smelting.

In the furnace according to this invention, not only can hard fuel, such as coke, be used, but any other solid fuel, such as coal, lignite, or wood, for example, can be efficiently employed, which is not the case in smelting in ordinary furnaces. The furnace according to this invention also enables the fuel used to be utilized to greater advantage because the blast can be maintained at a higher pressure in the furnace and with an increase of activity without danger of the furnace becoming clogged up by the charge becoming too dense.

I am aware that it has been proposed to reduce unsmelted, or partly smelted, ore by generating gases at successively increasing temperatures and passing such gases downward through the ore in a furnace which has to be recharged after each heat, and I am also aware that it has been proposed to treat finely divided ore by showering it down a stack and subjecting it, while in suspension to a whirling highly heated atmosphere moving in the same direction and then discharging into a reverberatory chamber wherein the unvolatilized molten metal constituent of the ore is caused to separate by gravity from the slag producing constituent, and no claim is made herein to any such processes.

I am also aware that it has been proposed to use twyers to admit hot blast to any required part of the furnace, and I make no claim to any such processes, or furnaces.

I am also aware that it has been proposed to smelt by means of a blast furnace having a down blast and series of independently worked twyers at various heights one or more of the series being about the zone of fusion, but my invention consists in having in a furnace with down blast, one series of twyers in the position described and shown.

I claim as my invention:

1. A smelting furnace of the type described, having a charging port in its upper part and valve means for maintaining the same closed during the operation of the furnace, a melting chamber in the lower portion of the furnace with a common outlet for the molten metal and the products of combustion, in combination with the single series of twyers arranged, as described, at the upper part of the zone of fusion, for admitting a blast of air to the charge whereby the whole of said blast passes entirely downward through the whole of the melting zone, substantially as and for the purpose described.

2. A smelting furnace of the type described, having a charging port in its upper part and valve means for maintaining the same closed during the operation of the furnace, a melting chamber in the lower portion of the furnace with a common outlet for the molten metal and the products of combustion, in combination with the single series of twyers arranged, as described, at the upper part of the zone of fusion for admitting a blast of air to the charge whereby the whole of said blast passes entirely downward through the whole of the melting zone, together with means for water cooling said melting chamber and outlet, substantially as described.

In testimony whereof I have signed my name to this specification in the presence of two subscribing witnesses.

BERNARD DE ST. SEINE.

Witnesses:
 HENRI I. MONTAGU,
 LAURENT DAMPS COMPTABLE.